(12) United States Patent
Lane

(10) Patent No.: US 6,298,437 B1
(45) Date of Patent: Oct. 2, 2001

(54) METHOD FOR VECTORING PREAD/PWRITE SYSTEM CALLS

(75) Inventor: Robert M. Lane, Dixon, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/320,125

(22) Filed: May 25, 1999

(51) Int. Cl.[7] .............................. G06F 13/38; G06F 13/16
(52) U.S. Cl. .............................. 712/225; 710/33; 710/61; 710/59; 710/34; 710/240; 711/208; 711/209; 711/221; 711/5; 711/203; 709/217
(58) Field of Search .............................. 712/225, 217, 712/226, 229, 248, 213, 4; 709/217, 252, 233, 234, 235, 236, 246; 710/5, 107, 18, 59, 19, 21, 61, 33, 50, 34–240, 55, 243, 52, 54; 711/170, 56, 171, 203, 172, 208, 209, 221

(56) References Cited

U.S. PATENT DOCUMENTS

| | | | |
|---|---|---|---|
| 4,974,149 | * | 11/1990 | Valenti .............................. 709/217 |
| 5,144,692 | * | 9/1992 | Baker et al. .......................... 710/240 |

* cited by examiner

Primary Examiner—Daniel H. Pan
(74) Attorney, Agent, or Firm—Conley, Rose & Tayon, PC; B. Noël Kivlin

(57) ABSTRACT

A method is provided for I/O data transfer between memory and disk. In one embodiment, an application program generates N data transfer requests. Thereafter, a data transfer list is created that comprises N entries each comprising a file sector descriptor and a buffer address. The application program is suspended in favor of initiating the operating system. Thereafter, N data transfers are performed, each one of which comprises transferring data between a file sector and a buffer identified by the file sector descriptor and a buffer address, respectively, contained in one of the entries of the data transfer list. On completion of N data transfers, the operating system is suspended and the application program is reinitiated.

14 Claims, 4 Drawing Sheets

METHOD FOR VECTORING PREAD/ PWRITE SYSTEM CALLS

BACKGROUND OF THE INVENTION

1. Field of the Invention

The present invention relates generally to data transfers to and from memory in a computer system, and more particularly, to a method for vectoring pwrites or preads.

2. Description of the Relevant Art

An application program running on a microprocessor-based digital computer often initiates system calls to services of the operating system (OS). Each system call involves a context switch between the application program and the operating system. Context switches typically require the state of the microprocessor and/or other components of the computer system to be saved before execution of the system service of the operating system. The operating system in turn loads the microprocessor and/or other components of the computer system with information needed to run the system service. Upon completion of the system service, the microprocessor and/or other components of the computer system must be returned to the state it was prior to the context switch. This requires the saved state to be loaded into the microprocessor and/or other computer components before resuming execution of the application program.

It can be appreciated by one of ordinary skill in the art that the overhead associated with each context switch limits performance of an application program running on a microprocessor-based digital computer. It is also appreciated that there is an indirect relationship between the number of system calls during execution of an application program and the overall performance in running the application program. In other words, a greater number of system calls increases the number of context switches which in turn reduces overall performance.

I/O data transfer between memory and disk typically requires one or more system calls, each one of which requires a substantial amount of system overhead. For example, it is not uncommon for an executing application program to generate several requests to transfer data between memory and disk. To further illustrate, an executing application program may generate ten requests to read data from disk. In the prior art, each of the ten read requests required one or more system calls to complete. This is particularly true if each of the ten read requests identifies a distinct destination buffer in memory to receive data. In some database application programs, a pair of system calls (e.g., lseek and read) is required for each requested read. The lseek system call positions the disk so that data can be read from a particular sector in the file. The lseek is needed since the read request may be directed to a sector in the file which may be remote from a previously read sector. The read system call subsequently reads data from the positioned sector of the disk, the read data ultimately being transferred to a destination buffer in memory.

To avoid the substantial overhead associated with two system calls, prior art implements preads and pwrites which combines a lseek and a read or write. Preads and pwrites are often referred to as-composite system calls. Thus, preads and pwrites employ one system call to transfer data between disk and memory. Preads, for example, contain an offset, an address of the destination buffer in user space, and a number of bytes to be transferred. Although preads and pwrites reduce the number of system calls associated with individual requests for data transfer, each pread and pwrite nonetheless requires an individual system call.

Vector reads (readv) and vector writes (writev) have been employed in the prior art to further reduce overhead associated with data transfers between memory and disk. In readv and writev system calls, a list of read operations or write operations is provided. The operating system uses the list to transfer data between disk and memory. For example, in a writev system call, the write operations causes data to be gathered from various buffers in memory. The gathered data is then transferred to one location on the disk. Likewise, a list of read operations is used in a readv system call by the operating system to gather data from distinct sectors on the disk. The gathered data is then provided to one location in memory. Readv and writev reduce system overhead when data is being transferred, for example, between multiple noncontiguous buffers and a single sector or between multiple noncontiguous sectors and a single buffer. If the data is to be stored in distinct sectors or distinct buffers, however, individual systems calls are required and there is no overhead savings in using vread or vwrite.

SUMMARY OF THE INVENTION

The present invention provides a method for reducing overhead associated with system calls. For example, the present invention provides a method which reduces overhead associated with system calls for transferring data between memory and disk in a computer system. In one embodiment, the present invention creates a data transfer list in response to executing an application program. This data list comprises N entries, each one of which comprises a file sector descriptor associated with a disk and a buffer address associated with main memory. The application program is suspended upon creation of the data transfer list. Thereafter, the operating system of the computer is initiated, which then performs N data transfers between memory and disk. Each data transfer comprises transferring data between a file sector and a buffer identified by the file sector descriptor and buffer address, respectively, contained in a corresponding one of the N entries of the data transferred list Upon completion of all N transfers, the operating system is suspended and application program is reinitiated.

BRIEF DESCRIPTION OF THE DRAWINGS

Other objects and advantages of the invention will become apparent upon reading the following detailed description and upon reference to the accompanying drawings in which.

Figure 1:
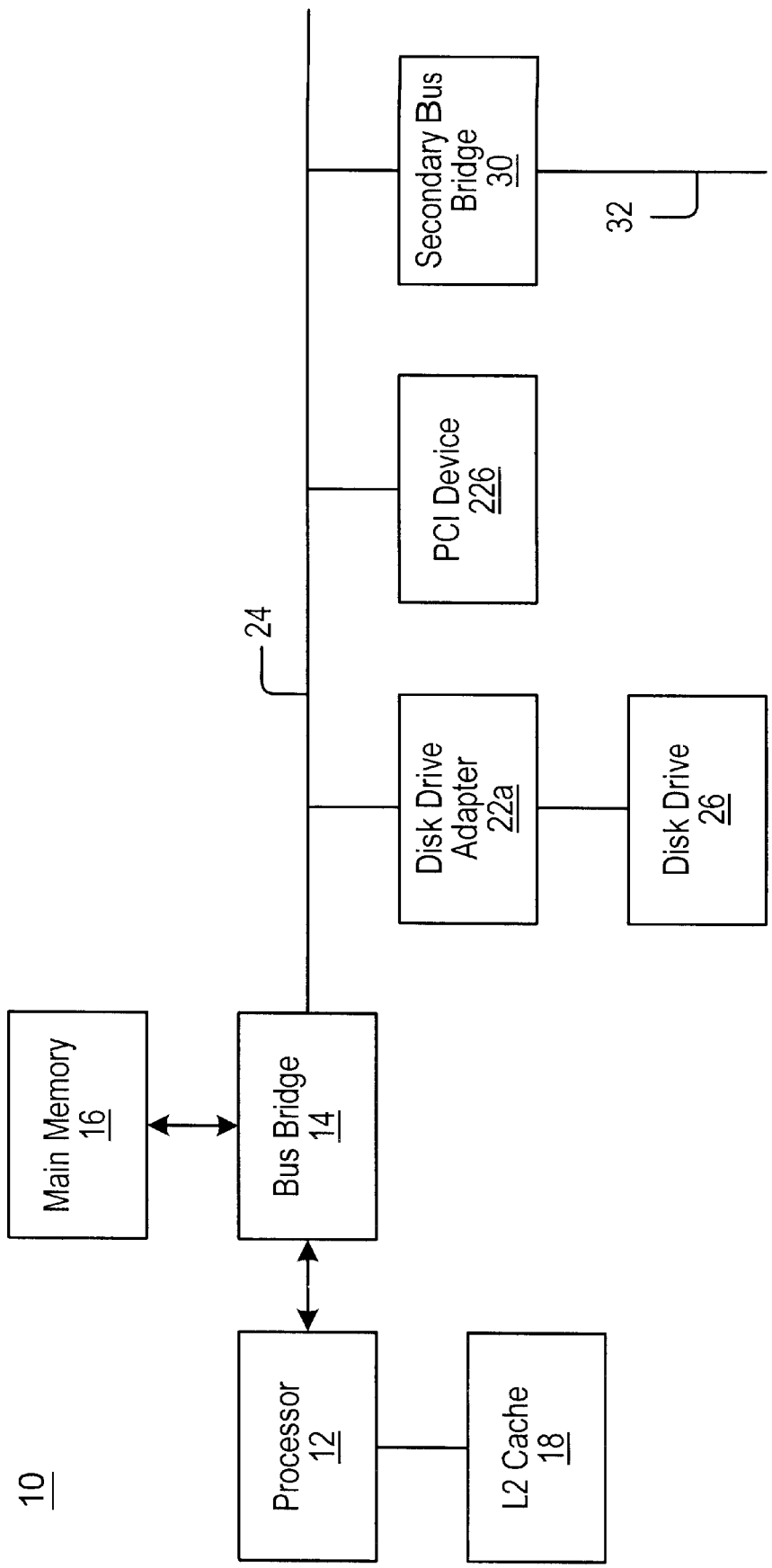
FIG. 1 is a block diagram of one embodiment of the computer system employing the present invention.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 illustrates a block diagram of one embodiment of a computer system 10 that implements the present invention. Other embodiments are possible and contemplated. Computer system 10 includes a processor 12 coupled to a to a level two cache 18 and a variety of system components via a bus bridge 14. In the depicted system, the main memory 16 is coupled to bus bridge 14 through a memory bus 20. A pair of PCI devices 22a and 22b are coupled to bus bridge 14 via PCI bus 24. One of the PCI devices 22a in this embodiment defines a disk drive adapter coupled to a disk drive 26. Finally, a secondary bus bridge 30 is provided to accommodate an electrical interface to one or more EISA or ISA devices (not shown) through an EISA/ISA bus 32.

Bus bridge 14 provides an interface between processor 12, main memory 16 and devices attached to PCI bus 24. When an operation is received from one of the devices connected to the bus bridge 14, bus bridge 14 identifies the target of the operation, and bus bridge 14 routes the operation to the targeted device. Bus bridge 14 generally translates an operation from the protocol used by the initiating device or bus to the protocol used by the target device or bus.

In addition to providing an interface to the ISA/EISA bus for PCI bus 24, secondary bus bridge 30 may further incorporate additional functionality as desired. An input/output controller (not shown) either external to or integrated in secondary bus bridge 30, may also be included within computer system 10 to provide operational support for a keyboard and mouse (not shown) and for various serial and parallel inputs as desired. An external cache unit (not shown) may further be coupled to the processor bus between processor 12 and bus bridge 14 in other embodiments. Cache 18 is shown in a backside configuration relative to processor 12. It is noted that cache 18 may be separate from processor 10 integrated into a cartridge via slot with processor 10, or integrated into a substrate of processor 12.

Main memory 16 is a memory in which an operating system (or portions thereof) and/or application programs which processor 12 primarily executes, are stored. A suitable main memory 16 comprises DRAM (dynamic random access memory). For example, a plurality of banks of SDRAM (synchronous DRAM) or rambus DRAM (RD ram) may be suitable.

PCI devices 22a and 22b are illustrative of a variety of peripheral devices such as, for example, network interface cards, video accelerators, audio cards, disk drive adapters, SCSI (small computer systems interface) adapters, and telephony cards. In FIG. 1, PCI device 22a, as noted above, is a disk drive adapter coupled to a disk drive 26. ISA devices (not shown in FIG. 1) coupled to EISA/ISA bus 32 may define various types of peripheral devices, such as a modem, a sound card, and a variety of data acquisition cards such as GPIB or field bus interface cards.

Processor 12 is configured to execute application programs of the operating system stored main memory 16. Processor 12, running an application program, generates requests for data transfer between main memory 16 and a location in 1/0 space. For example, processor 12 may request data transfer between main memory 16 and a hard disk (not shown) via disk drive 26, disk drive adapter 22a, and bus bridge 14. However, as noted above, such a data transfer is implemented using an operating system service initiated by an operating service call. Before the operating system service can be initiated by processor 12, the current state of the application program running on processor 12 and thus state of the processor 12, must be saved typically in main memory 16 at the point of the service call. The state of processor 12 must be saved so that upon return to the application program, processor 12 can correctly continue processing the application at the point where it was suspended to invoke system service. Further, before processor 12 can initiate the operating system service to transfer data between main memory and the hard disk, processor 12 must be loaded with the appropriate operating system service state. As noted above, this context switch reduces overall performance of the processor 12 running the application program.

As noted above, pread/pwrite system calls position individual read/write operations generated by processor 12 running an application program, but do not vector read or write operations. In contrast, readv/writev system calls vector multiple sectors in disk or multiple buffers in main memory associated with multiple read/write operations, respectively, generated by the processor 12 running the application program, but do not position them individually in distinct noncontiguous buffers in memory or distinct noncontiguous sectors of disk. The present invention proposes a composite of pread/pwrite and readv/writev system calls which both position and vector read/write operations generated by processor 12 running the application program, with a single system call. In doing so, such a system call reduces the overall number of system calls and associated overhead thereby streamlining I/O data transfer operations.

Current iovec structure contains two element:

```
typedef struct iovec {
    caddr_t iov_base;
    int iov_len
} iovec_t;
```

Simply adding one more element to the current iovec structure creates a new structure as follows:

```
typedef struct piovec {
    cqaddr_t iov_base;
    int iov_len
    offset_t iov_offset;
} piovec_t
```

Generally, a write system call writes data at a file pointer offset in a sector of a structure file on the disk drive. The open system call with O_APPEND, guarantees that the file pointer will always be the end of the file. The system call lseek manipulates that offset.

As noted above, applications running on processor 12 may generate several requests, for example, to write at various noncontiguous locations throughout a file on the disk. For example, a multi-threaded application running on processor 12 may seek to transfer the contents of a series of buffers in main memory 16 to distinct noncontiguous locations throughout the file on the disk. In this situation, the write system call requires each lseek and write pair to be mutual exclusion protected. Thus, each transfer between a memory buffer and a sector location within the file on disk requires the following:

```
for each buffer
    mutex_lock ()
    lseek ()
    write()
    mutex_unlock ()
end
```

Thus, if five buffers are required to be written, this amounts to ten system calls plus mutual exclusion. The pwrite system call, as noted above, combines the lseek and write calls to reduce by half the number of system calls in writing a buffer to disk. Thus, in our example of writing five buffers to disks, using pwrite requires five system calls and no mutual exclusion.

The writev system call requires data to be transferred to contiguous areas on disk beginning at the file offset. This requires mutual exclusion. Thus, using a writev system call requires:

mutex_lock ()
lseek ()
writev ()
mutex_unlock ()

In our example of writing five buffers to disk, writev requires just two system calls. However, writev does not solve the problems of writing buffers to noncontiguous areas on disk. Thus, if the buffers are to be written to noncontiguous areas on disk, then ten system calls are required with mutual exclusion.

Figure 2:
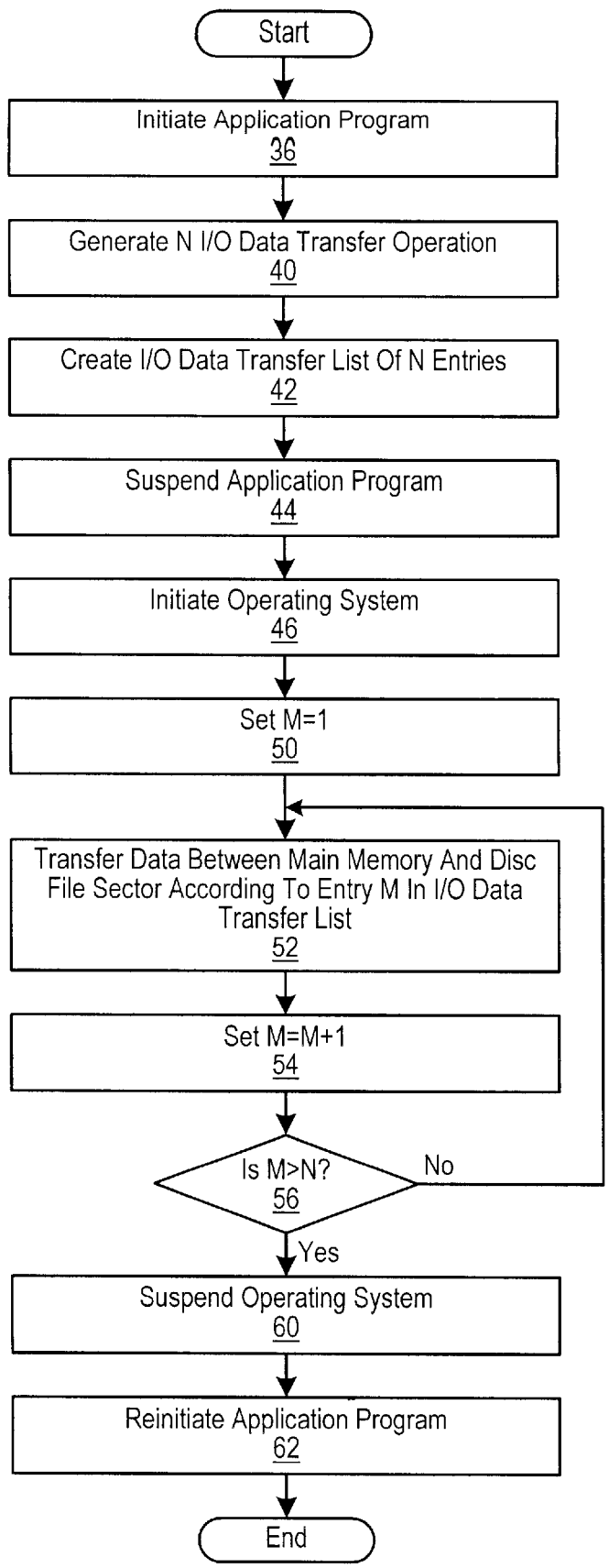
FIG. 2 is a flow chart illustrating operational aspects of one embodiment of the present invention.

FIG. 2 is a flow chart illustrating operational aspects of transferring data between memory space and I/O space in accordance with the present invention. In one sense, the flow chart shown in FIG. 2 illustrates the functionality of combining pwrite and writev system calls or pread and writev system calls. More particularly, in step 40 of FIG. 2 an application program running on processor 12 generates N I/O data transfer operations. In line with the previous example, the present invention will be described with reference to processor 12 generating five write buffer to disk operations. In step 42, an I/O data transfer list of N entries is formed. In one embodiment, each entry on the list contains an identification of the buffer, a file sector descriptor, an offset to the file sector descriptor, and a data transfer size. When a complete transfer list is created, the application program running on processor 12 is suspended as shown in step 44, and the operating system is initiated as shown in step 46. The operating system, in turn, transfers data between buffers of main memory and disk sectors of the hard disk according to each entry of the data transfer list generated previously. For example, in step 50, a variable M is set to 1. In step 52, a single transfer is made between main memory and the disk according to the first entry (M=1) in the I/O data transfer list. More particularly, the data transfer is made between the memory buffer and the sector identified within the first entry of the data transfer list. Thereafter, M is incremented as shown in step 54 and the steps 50–52 are repeated until N transfers between main memory and disk have occurred. Upon completion of each of the N data transfers, as shown in steps 60 and 62, the operating system is suspended and the application program is reinitiated.

Figure 3:
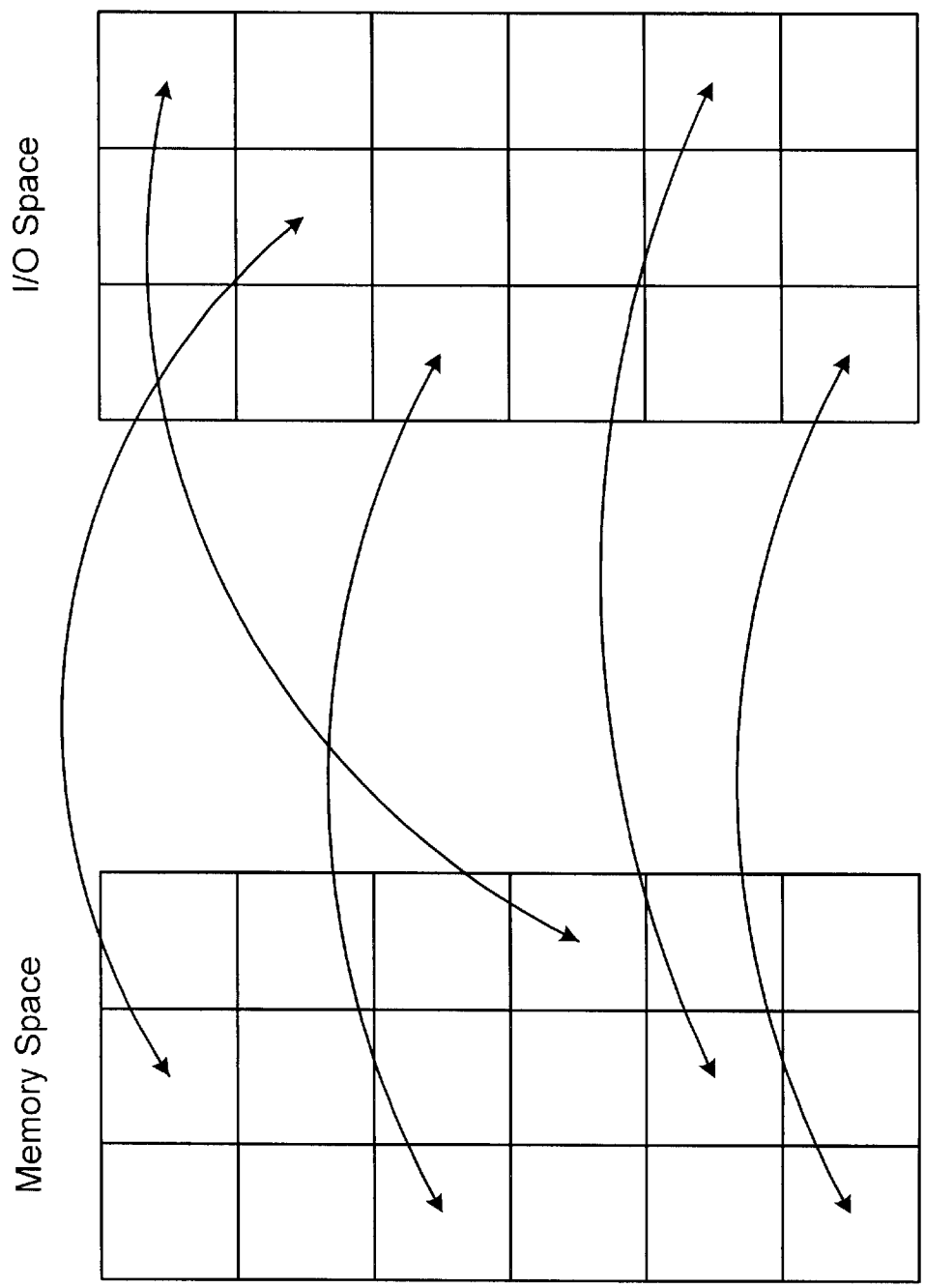
FIG. 3 is a diagram illustrating operational aspects of a data transfer between memory space and I/O space in accordance with the present invention.
Figure 4:
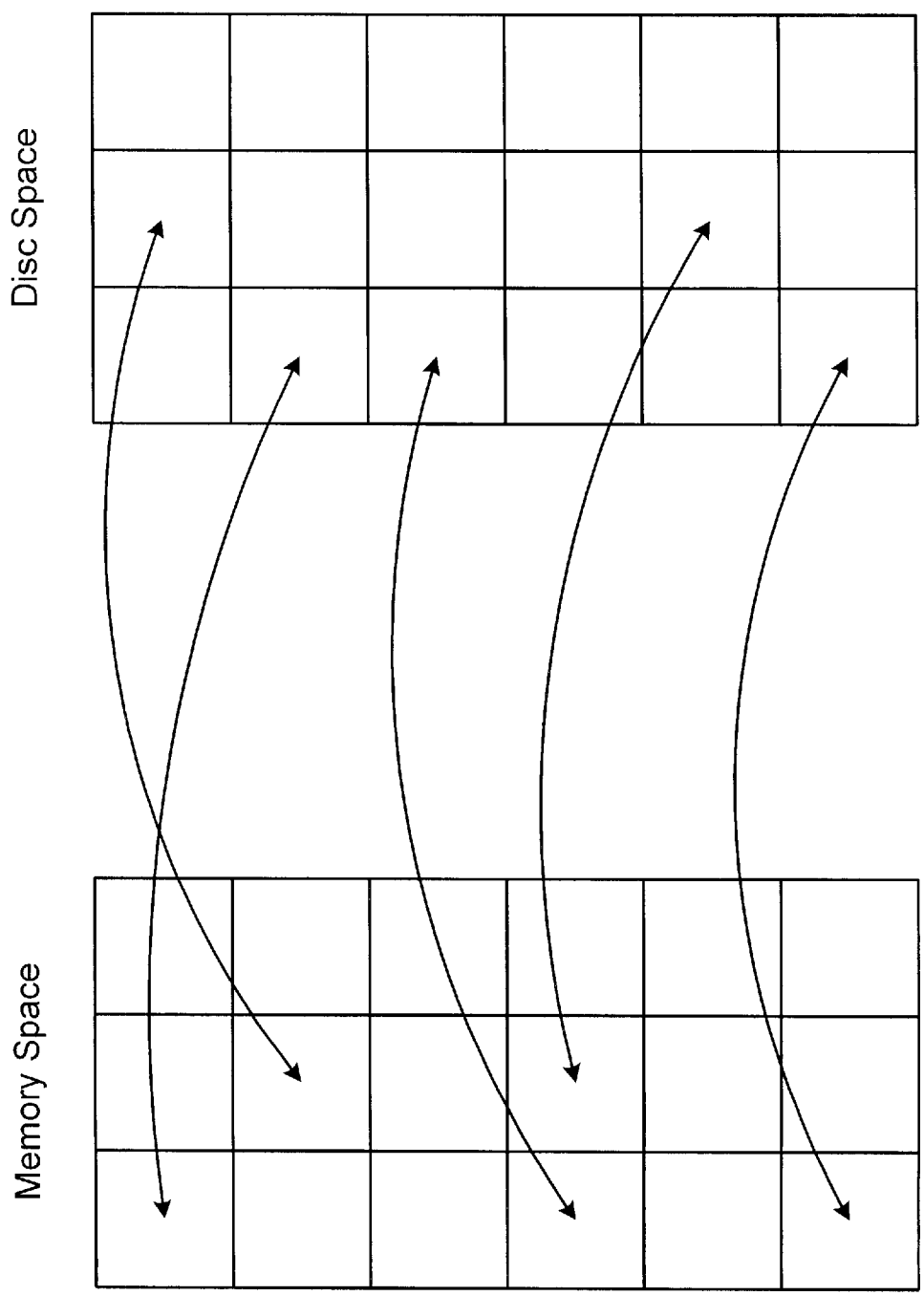
FIG. 4 is a diagram illustrating operational aspects of a data transfer between memory space and disk space in accordance with one embodiment of the present invention.

It is important to note that multiple data transfers between memory buffers of main memory and sectors of disk occur in a single system call. Accordingly, a single context switch is required. FIG. 3 illustrates a transfer of five buffers in main memory to five noncontiguous areas in I/O space in accordance with the present invention using a single system call. FIG. 4 more particularly illustrates five,data transfers from memory buffers to noncontiguous disk sectors using one system call in accordance with the present invention. It is to be noted that the present invention should not be limited to data transfer between main memory and disk space. Rather, the present invention has application to multiple data transfers between memory space and I/O space in general. However, it can be seen from FIGS. 3–4 that with the present invention, noncontiguous buffers can be transferred to noncontiguous sectors in a file using a single system call. Without using the present invention, the transfers shown in FIGS. 3 and 4 would require nine system calls and mutual exclusion. The O/S semantics for handling this could mimic that of writev system calls.

A situation where the invention may have application which could prove efficient is with a software program which manages a set of pages in memory and ages them using an LRU algorithm. A page thread writes dirty pages to disk. A single system call of the present invention would allow them to populate a piovec_t array and perform a single write. Similarly, the application program which manages a set of pages in memory and ages them using an LRU algorithm can populate a piovec_t array and perform a single read to replace free buffers with active data.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fill within the scope of the invention as detailed within the following claims.

What is claimed is:

1. A method of operating a computer system, the method comprising:

initiating an execution of an application program on the computer system;

creating a data transfer list in response to executing the application program, wherein the data transfer list comprises N entries, each entry comprising a file sector descriptor and a buffer address;

suspending execution of the application program in response to creating the data transfer list;

initiating execution of an operating system on the computer system in response to suspending execution of the application program;

performing N data transfers after initiating execution of the operating system, wherein each data transfer comprises transferring data between a file sector and a buffer identified by the file sector descriptor and buffer address, respectively, contained in a corresponding one of the N entries of the data transfer list;

suspending execution of the operating system upon completion of the Nth data transfer, and;

reinitiating execution of the application program in response to suspending execution of the operating system.

2. The method of claim 2 wherein each of the N data transfers comprises transferring data from the file sector to the buffer identified by the file sector descriptor and buffer address, respectively, contained in the corresponding one of the N entries of the data transfer list.

3. The method of claim 1 wherein each of the N data transfers comprises transferring data from the buffer to the file sector identified by the file sector descriptor and buffer address, respectively, contained in the corresponding one of the N entries of the data transfer list.

4. The method of claim 1 wherein the buffer is a portion of a random access main memory of the computer system, and wherein the file sector of is a portion of disc memory.

5. The method of claim 1 where each entry of the list of N entries comprises a size of data to be transferred and a buffer offset from the buffer address to or from where data is to be transferred.

6. The method of claim 1 wherein the buffer addresses in the data transfer list identify noncontiguous portions of memory in a random access main memory of the computer system.

7. The method of claim 1 wherein the file sector descriptors in the data transfer list identify noncontiguous sectors in a disc memory of the computer system.

8. A method of operating a computer system, the method comprising:

initiating an execution of an application program on the computer system;

creating a data transfer list in response to executing the application program, wherein the data transfer list comprises N entries, each entry comprising a file sector descriptor and a buffer address;

initiating an operating system call;

performing N data transfers after initiating the operating system call, wherein:

a first data transfer comprises transferring data between a first file sector and a first buffer identified by a first file sector descriptor and a first buffer address, respectively, contained in a first entry of the data transfer list, and;

an Nth data transfer comprises transferring data between a Nth file sector and a Nth buffer identified by a Nth file sector descriptor and a Nth buffer address, respectively, contained in a Nth entry of the data transfer list.

9. The method of claim 8 wherein the first buffer is distinct from the Nth buffer.

10. The method of claim 8 wherein the first file is distinct from the Nth file.

11. The method of claim 8 wherein the first and Nth buffers are portions of memory in a main random access memory of the computer system.

12. The method of claim 8 wherein the first and Nth file sectors are portions in a disc memory of the computer system.

13. The method of claim 8 further comprising pushing the data transfer list onto a stack of a random access memory.

14. A method of operating a computer system, the method comprising:

initiating an execution of an application program on the computer system;

creating a data transfer list in response to executing the application program, wherein the data transfer list comprises N entries, each entry comprising a first descriptor and a buffer address;

initiating an operating system call;

performing N data transfers after initiating the operating system call;

wherein a first data transfer of the N data transfers comprises transferring data between a first memory location in I/O space and a first main memory buffer in identified by a first descriptor and a first main memory buffer address, respectively, contained in a first entry of the data transfer list, and;

wherein an Nth data transfer of the N data transfers comprises transferring data between a Nth first memory location in I/O space and a Nth main memory buffer identified by a Nth descriptor and a Nth buffer address, respectively, contained in a Nth entry of the data transfer list.

* * * * *